United States Patent [19]
Tamura et al.

[11] Patent Number: 5,856,610
[45] Date of Patent: Jan. 5, 1999

[54] PROCESS FOR PRODUCING ETHYLENE-α-OLEFIN COPOLYMERS

[75] Inventors: Mitsuhisa Tamura; Kiyoshi Iwanaga, both of Ichihara; Kenichi Nariyama, Fukuoka; Takahiro Hino, Ibaraki; Masakazu Aihara, Ichihara, all of Japan

[73] Assignee: Sumitomo Chemical Company, Limited, Osaka, Japan

[21] Appl. No.: 752,225

[22] Filed: Nov. 19, 1996

[30] Foreign Application Priority Data

Nov. 22, 1995 [JP] Japan ................................. 7-304026

[51] Int. Cl.⁶ ........................................................ C08F 2/34
[52] U.S. Cl. ........................... 585/517; 585/12; 585/329
[58] Field of Search .................................. 585/517, 329, 585/12

[56] References Cited

U.S. PATENT DOCUMENTS

| | | | |
|---|---|---|---|
| 4,532,370 | 7/1985 | Le Quan et al. | 585/512 |
| 4,740,645 | 4/1988 | Garwood et al. | 585/329 |
| 5,019,357 | 5/1991 | Harandi et al. | 422/192 |

FOREIGN PATENT DOCUMENTS

| | | |
|---|---|---|
| 059034 | 2/1981 | European Pat. Off. . |
| 608447 | 8/1994 | European Pat. Off. . |
| 622347 | 11/1994 | European Pat. Off. . |
| 329767 | 4/1991 | Japan . |
| 6239920 | 8/1994 | Japan . |
| 6298673 | 10/1994 | Japan . |

*Primary Examiner*—Glenn Caldarola
*Assistant Examiner*—Thuan D. Dang
*Attorney, Agent, or Firm*—Sughrue, Mion, Zinn, Macpeak & Seas, PLLC

[57] ABSTRACT

A process for producing an ethylene-α-olefin copolymer which includes subjecting ethylene to an oligomerization reaction in the presence of an oligomerization catalyst to convert a part of the ethylene to α-olefin, and thereby obtaining a reaction solution, a reaction gas or a mixture of the reaction solution and the reaction gas containing α-olefin and unreacted ethylene; distilling the reaction solution, the reaction gas or the mixture of the reaction solution and the reaction gas to obtain a mixture consisting mainly of ethylene and α-olefin from the top of the distillation column; and feeding a starting material containing the mixture obtained from the distillation column into a polymerization reactor, thereby copolymerizing the ethylene and α-olefin in the presence of a polymerization catalyst to obtain an ethylene-α-olefin copolymer.

8 Claims, 4 Drawing Sheets

PROCESS FOR PRODUCING ETHYLENE-α-OLEFIN COPOLYMERS

BACKGROUND OF THE INVENTION

The present invention relates to a process for producing ethylene-α-olefin copolymers. More particularly, the present invention relates to a process for producing ethylene-α-olefin copolymers which has no steps of separating the unreacted ethylene and/or dissolved ethylene from a reaction solution, a reaction gas or a mixture of the reaction solution and the reaction gas obtained by an oligomerization reaction and then recycling the unreacted or dissolved ethylene into the oligomerization reaction, and therefore can omit at least the compressor for elevating the pressure and further omit the distillation column for purifying the crude α-olefin, if desired, and therefore is quite advantageous from the viewpoints of equipment cost and operation cost.

As the general process for producing ethylene-α-olefin copolymers, there can be referred to the process of oligomerizing ethylene in the presence of an oligomerization catalyst to obtain a crude α-olefin, purifying the crude α-olefin to obtain a purified α-olefin, introducing the purified α-olefin into a polymerization reactor together with otherwise freshly supplied ethylene, and copolymerizing the α-olefin and the ethylene in the presence of a polymerization catalyst to obtain an ethylene-α-olefin copolymer. However, this general process requires a step for separating the unreacted ethylene and/or dissolved ethylene present in the reaction solution, the reaction gas or the mixture of the reaction solution and the reaction gas obtained by the oligomerization reaction and then recycling into the oligomerization reaction, from the viewpoint of economy. For this purpose, at least a compressor for elevating the pressure is necessary, and therefore this general process is not high in efficiency from the viewpoint of equipment cost and operation cost.

SUMMARY OF THE INVENTION

The present inventors conducted many extensive studies on a process for producing ethylene-α-olefin copolymer free from the above-mentioned disadvantages. As a result, there has been found the process of the present invention in which the unreacted and/or dissolved ethylene is not separated nor recycled them into the oligomerization step, but is fed into the polymerization reactor and subjected to copolymerization. Accordingly, in the process of the present invention, at least the compressor for elevating the pressure can be omitted and further the distillation column for purifying the crude α-olefin can also be omitted, if desired, and therefore the process of the present invention is quite advantageous from the viewpoint of equipment cost and operation cost. Based on this knowledge, the present invention has been accomplished.

Thus, the present invention relates to a process for producing an ethylene-α-olefin copolymer comprising the following Steps 1 to 3.

Step 1: A step of subjecting ethylene to an oligomerization reaction in the presence of an oligomerization catalyst system and thereby converting at least a part of the ethylene to an α-olefin and then obtaining a reaction solution, a reaction gas or a mixture of the reaction solution and the reaction gas containing said α-olefin and unreacted ethylene.

Step 2: A step of subjecting the reaction solution, the reaction gas or the mixture of the reaction solution and the reaction gas obtained in Step 1 to distillation and thereby obtaining a mixture containing ethylene and α-olefin as main component from the top of the distillation column.

Step 3: A step of feeding the starting material of polymerization consisting of the mixture obtained in Step 2 to a polymerization reactor, and subjecting the ethylene and α-olefin to a copolymerization reaction in the presence of a polymerization catalyst to obtain an ethylene-α-olefin copolymer.

[Explanation of Symbols]

Figure 1:
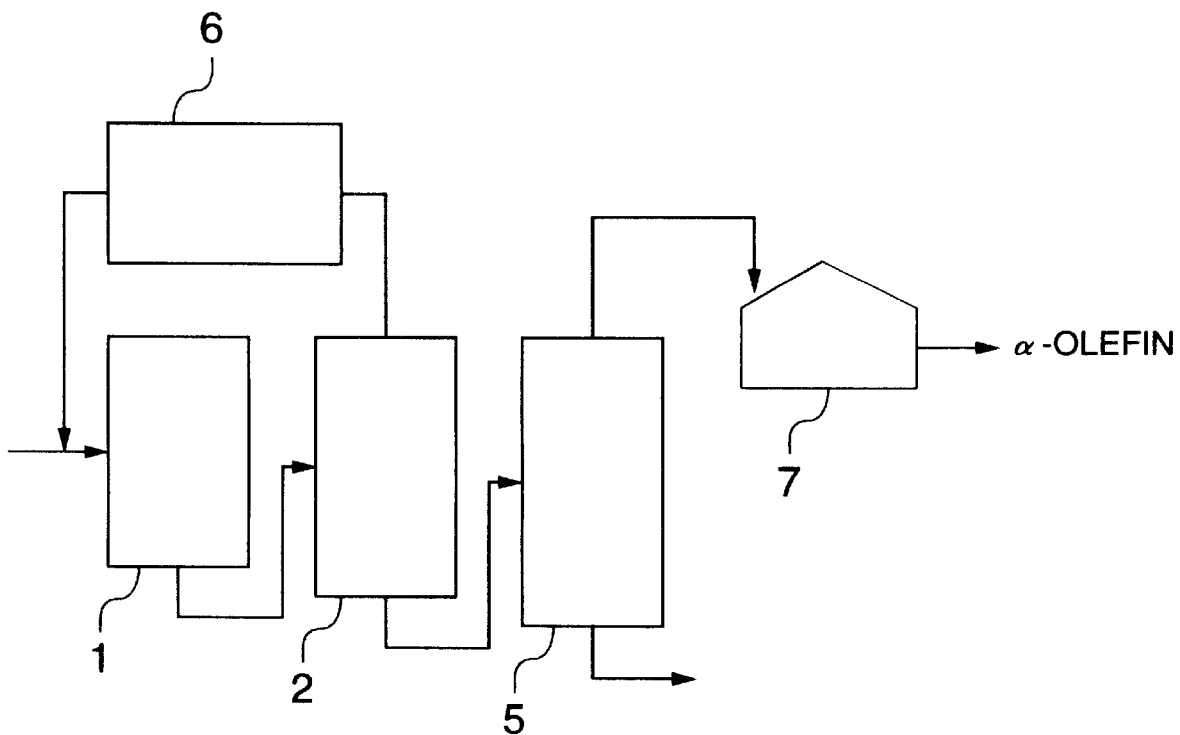
FIG. 1 is a diagram illustrating the process for producing α-olefin of prior art.
Figure 2:
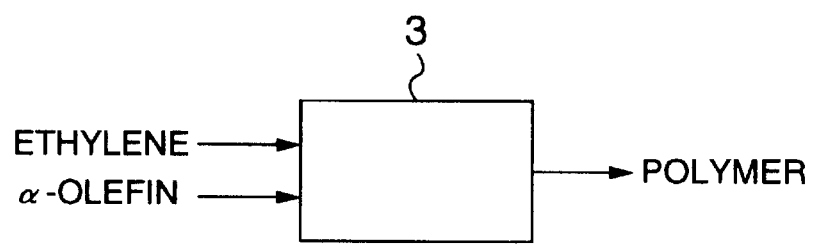
FIG. 2 is a diagram illustrating the polymerization process of prior art.
Figure 3:
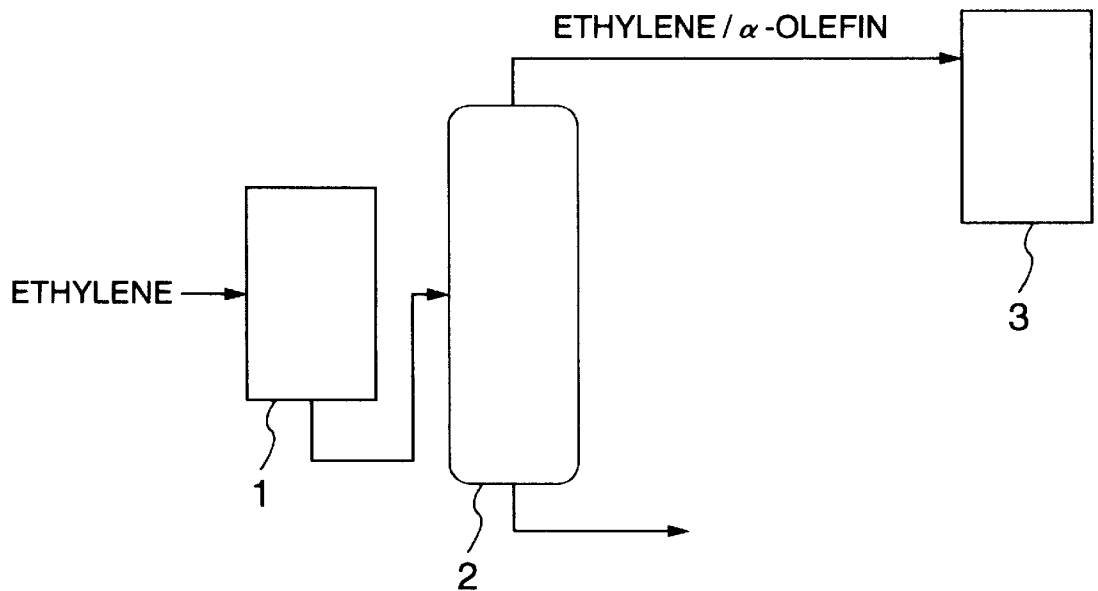
FIG. 3 is a diagram illustrating the polymerization process of the present invention.

1 oligomerization reactor
2 distillation column
3 polymerization reactor
4 cooler
5 distillation column
6 compressor
7 tank
a reaction solution obtained by dimerization or trimerization of ethylene
b distillate from the top of the column consisting mainly of ethylene and C4 or C6
c effluent from the bottom of the column consisting mainly of C8 or C10
d fresh ethylene
e distillate from the top of the column consisting mainly of ethylene
f effluent from the bottom of the column containing α-olefins and consisting mainly of components having a boiling point higher than that of ethylene
g distillate from the top of the column consisting mainly of α-olefin
h effluent from the bottom of the column consisting mainly of C8 or C10.

DETAILED DESCRIPTION OF THE INVENTION

The present invention is explained in more detail below (cf. FIGS. 3–8).

Step 1 is a step of subjecting ethylene to an oligomerization reaction in the presence of an oligomerization catalyst system to convert at least a part of the ethylene to an α-olefin, and thereby obtaining a reaction solution, a reaction gas or a mixture of the reaction solution and the reaction gas containing said α-olefin and unreacted ethylene.

As the oligomerization catalyst system, for example, the ethylene-trimerization catalyst system for obtaining 1-hexene by trimerization of ethylene can be referred to. As said catalyst system, well known catalyst systems can be used. For example, JP-A 6-239920 discloses a method for trimerizing ethylene by the use of a catalyst system comprising a combination of a chromium compound, a pyrrole-containing compound and an alkylmetal, or a catalyst system comprising a chromium compound, a pyrrole-containing compound, an alkylmetal and halogen. Further, JP-A 6-298673 discloses a method for trimerizing ethylene by the use of a catalyst system comprising a coordinated complex of aluminoxane and phosphine, arsine and/or stibine which are all a polydentate ligand of chromium salt.

Said trimerization can be effected according to a solution reaction method, a slurry reaction method or a gas phase reaction method using a solid catalyst. As solvents of the solution reaction method and the slurry reaction method, saturated hydrocarbons such as butane, isobutane, hexane, heptane, octane, cyclohexane, decalin and the like, unsaturated hydrocarbons such as 1-hexene, decene and the like, and aromatic hydrocarbons such as benzene, toluene, xylene, tetralin and the like can be referred to. The use of 1-hexene as a solvent is particularly preferable, because 1-hexene is a product of trimerization reaction.

The reaction temperature is usually 0°–250° C., and the reaction pressure is usually 0–150 kg/cm$^2$.

As another oligomerization catalyst system, the ethylene dimerization catalyst system for obtaining 1-butene by dimerization of ethylene can be referred to. As said catalyst system, well known catalyst systems can be used. For example, JP-B 3-29767 discloses a method for dimerizing ethylene by the use of a catalyst system obtainable by an interaction of alkyl titanate and alkylaluminum compound.

Said dimerization can be effected according to a solution reaction method, a slurry reaction method or a gas phase reaction method using a solid catalyst. As solvents of the solution reaction method and the slurry reaction method, saturated hydrocarbons such as butane, isobutane, hexane, heptane, octane, cyclohexane, decalin and the like, unsaturated hydrocarbons such as 1-butene and the like, and aromatic hydrocarbons such as benzene, toluene, xylene, tetralin and the like can be referred to. The use of 1-butene as a solvent is particularly preferable, because 1-butene is a product of dimerization.

The reaction temperature is usually 0°–150° C., and the reaction pressure is usually 0–150 kg/cm$^2$.

As the result of the oligomerization reaction, a reaction solution, a reaction gas or a mixture of the reaction solution and the reaction gas containing α-olefin and unreacted ethylene is obtained.

Step 2 is a step of subjecting the reaction solution, the reaction gas or the mixture of the reaction solution and the reaction gas obtained in Step 1 to distillation, and obtaining a mixture consisting mainly of ethylene and α-olefin from the top of the distillation column.

From the viewpoint of preventing the accumulation of impurities into Step 3 and improving the quality of ethylene-α-olefin copolymer, it is preferable in the present invention to adjust the conditions of distillation such as theoretical plate, reflux ratio, column top pressure, column bottom pressure, column top temperature, column bottom temperature or the like, so that at least 95% by weight of the mixture obtained from the top of the distillation column is consisting of ethylene and α-olefin. As concrete conditions of the distillation, for example, the theoretical plate of 3 or more, the reflux ratio of 0.05 or more, and the pressure ranging from ordinary pressure to 30 kg/cm$^2$ can be referred to.

Figure 4:
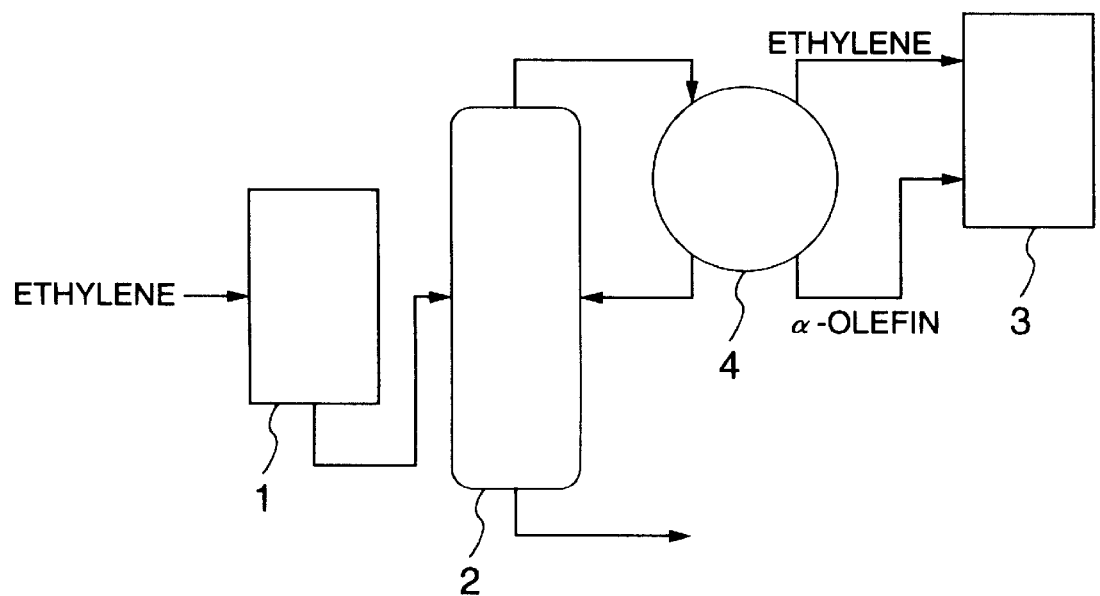
FIG. 4 is a diagram illustrating preferable polymerization process of the present invention.

In the present invention, there may be adopted, if desired, a method of cooling the mixture obtained from the top of the distillation column of Step 2 to prepare a gas consisting mainly of ethylene and a liquid consisting mainly of α-olefin and feeding the gas and the liquid into the polymerization reactor of Step 3. The ethylene content in the gas and the α-olefin content in the liquid are simply dependent on the operating conditions of distillation column, namely theoretical plate, reflux ratio, pressure, temperature and cooling temperature of the mixture. This method is desirable from the viewpoint of controlling the feed of α-olefin and removing the heat of polymerization reaction (FIG. 4).

Figure 5:
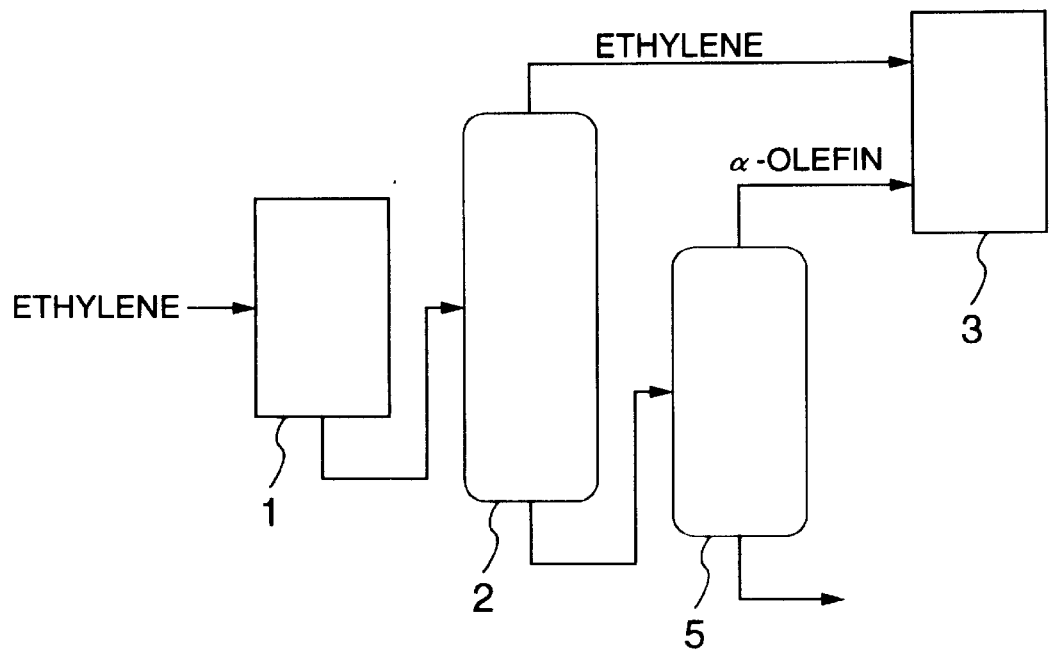
FIG. 5 is a diagram illustrating preferable polymerization process of the present invention.

In the present invention, there may also be adopted, if desired, a method of obtaining a mixture consisting mainly of ethylene from the top of distillation column of Step 2, obtaining a effluent from the bottom of the column, further distilling the effluent to obtain a mixture consisting mainly of α-olefin from the top of the second distillation column, and feeding the mixture consisting mainly of ethylene and the mixture consisting mainly of α-olefin to the polymerization reactor of Step 3. In this method, ethylene content in the mixture obtained in the first distillation is preferably 50% by weight or more, and α-olefin content in the mixture obtained in the second distillation is preferably 50% by weight or more. This method is preferable from the viewpoint of controlling the feed of α-olefin and removing the heat of polymerization reaction (FIG. 5).

Step 3 is a step of feeding the starting material of polymerization consisting of the mixture obtained in Step 2 to a polymerization reactor, and copolymerizing the ethylene and α-olefin in the presence of a polymerization catalyst to obtain an ethylene-α-olefin copolymer.

As the polymerization catalyst, well known polymerization catalysts for use in production of ethylene-α-olefin copolymers can be used. As examples of the polymerization catalyst, Ziegler type catalysts exemplified by titanium trichloride or Ti/Mg composite system, and metallocene type catalysts exemplified by zirconocene dichloride/polymethylaluminoxane can be referred to. As the polymerization conditions, conventionally conditions for production of α-olefin copolymers can be employed. For example, the polymerization temperature is preferably –30° C. to 300° C. Though the polymerization pressure is not particularly limited, a pressure of about 3 to about 3,000 kg/cm$^2$ is preferable from the industrial and economical points of view. As the method of the polymerization, a slurry polymerization or a solution polymerization using a saturated hydrocarbon such as propane, butane, isobutane, pentane, hexane, heptane, octane or the like or aromatic hydrocarbon solvent such as toluene or the like, or liquid phase or gas phase polymerization using no solvent can be adopted.

Figure 6:
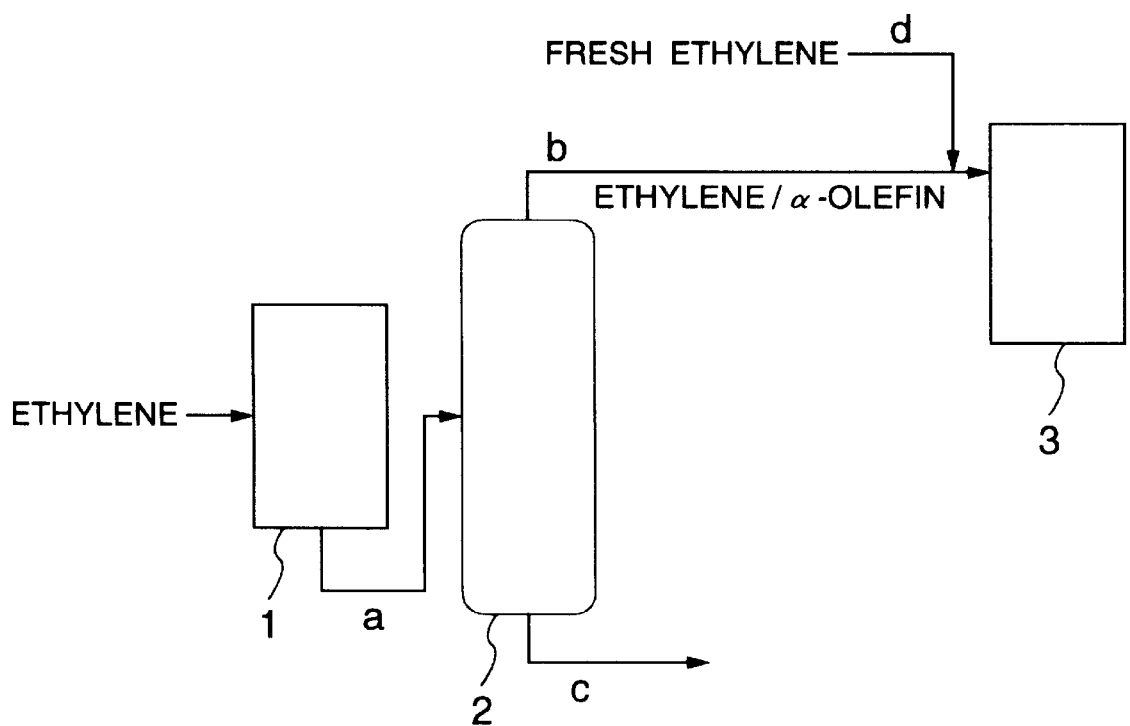
FIG. 6 is a diagram illustrating preferable polymerization process of the present invention.
Figure 7:
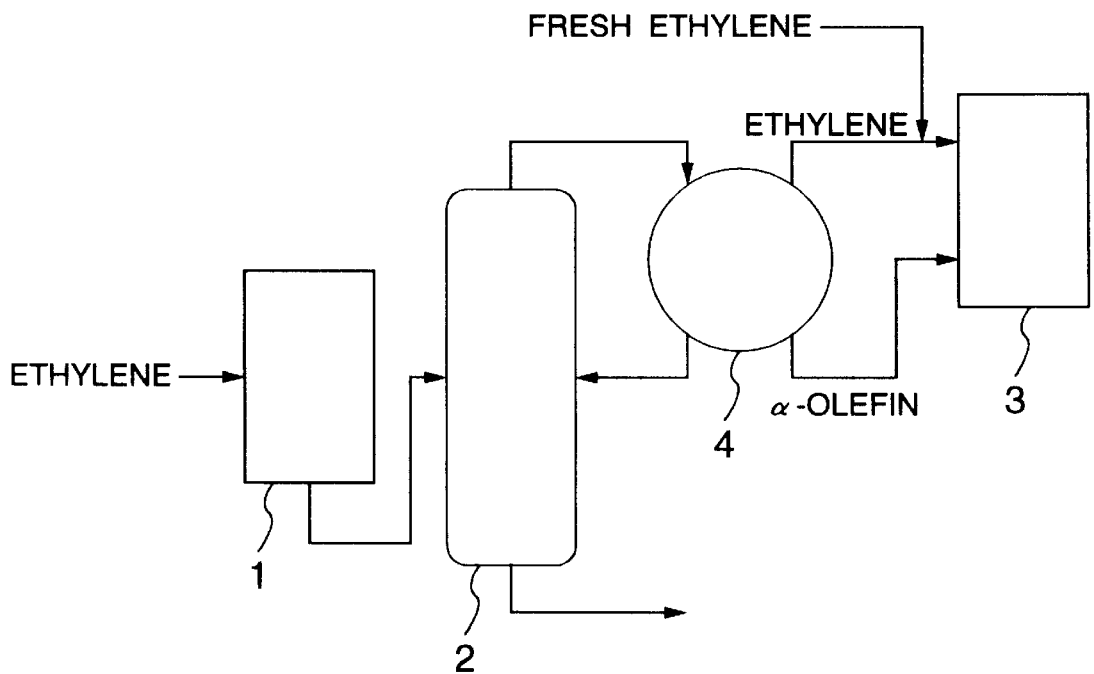
FIG. 7 is a diagram illustrating preferable polymerization process of the present invention.
Figure 8:
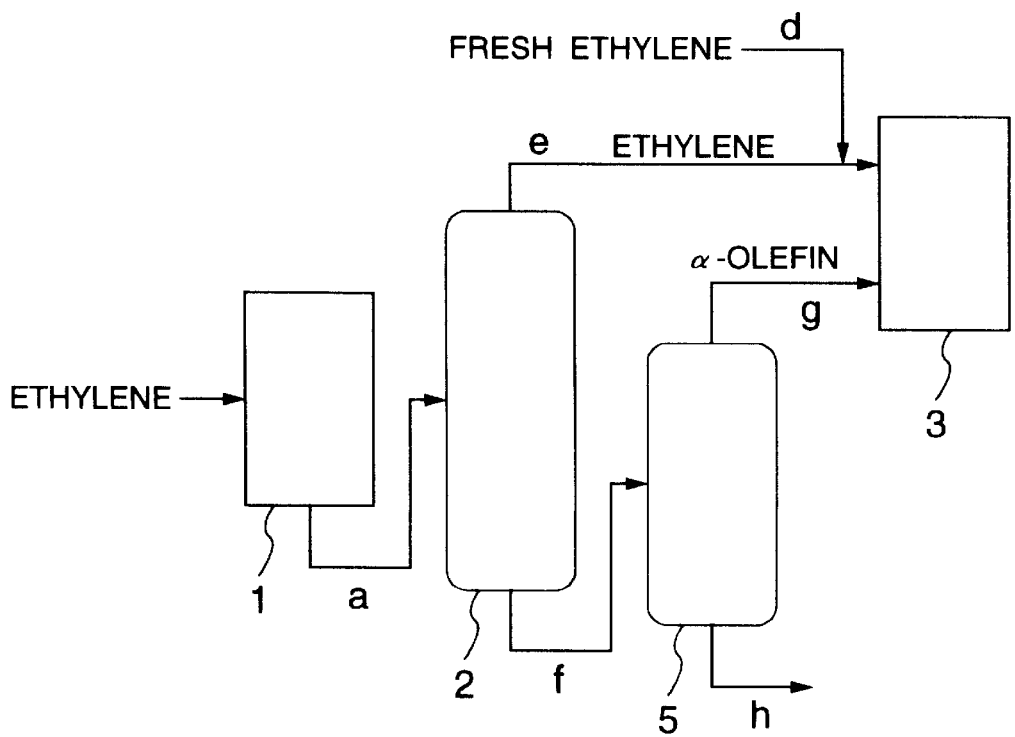
FIG. 8 is a diagram illustrating preferable polymerization process of the present invention.

In the present invention, when shortage of the ethylene in the starting material of polymerization to be fed into the polymerization reactor of Step 3 must be filled up, ethylene may be freshly fed from a route other than Steps 1 and 2, as a part of the starting material of polymerization (FIG. 6, FIG. 7, FIG. 8).

The present invention can be put into practice in a narrow space by connecting the reactor, the distillation column and the like used in Steps 1–3 in a direct manner via piping. In order to feed each fluid to the desired point, a blower, a pump, a compressor or the like may be provided in the halfway of the piping, if desired.

In the above-mentioned manner, an ethylene-α-olefin copolymer can be produced in a very high efficiency. As the α-olefin constituting the copolymer, not only 1-hexene and 1-butene but also 4-methyl-1-pentene, 1-octene and the like can be referred to. The ethylene-α-olefin copolymers obtained according to the present invention usually have a density of about 0.860 to 0.950 g/cm$^3$.

According to the present invention, the unreacted and/or dissolved ethylene can directly be fed into the polymerization reactor and subjected to copolymerization reaction, instead of separating the unreacted and/or dissolved ethylene and recycling them into the step of oligomerization. This at least makes it unnecessary to provide a compressor for elevating the pressure of the ethylene to be recycled into the oligomerization reaction. Further, this makes it possible to omit the use of distillation column for purifying the crude α-olefin, if desired, which makes it possible to produce ethylene-α-olefin copolymers much more advantageously from the viewpoint of equipment cost and operation cost.

DESCRIPTION OF PREFERRED EMBODIMENTS

Next, the present invention is explained with reference to examples. The invention is by no means limited by these examples.

Example of Preparation of Catalyst: Catalyst for Trimerization of Ethylene

Under an atmosphere of argon gas, 0.525 g (1 mmol) of chromium (III) chloride tris(4-dimethylamino)pyridine was suspended in 100 g of previously deaerated and dehydrated 1-hexene. The suspension was cooled with ice water bath, into which were dropwise added 0.285 g (3 mmol) of 2,5-dimethylpyrrole, 0.643 g (3 mmol) of sesquialuminum chloride and 3.425 g (30 mmol) of triethylaluminum successively. After the dropping, the resulting solution was stirred for 30 minutes or more, and then used as a catalyst solution.

EXAMPLE 1

A SUS 316 reactor having a capacity of 0.5 liter was charged with 100 g of 1-hexene as a solvent and 2.6 g of the solution of ethylene trimerization catalyst in 1-hexene obtained in the above-mentioned Example of Preparation of Catalyst. Then, a trimerization of ethylene was carried out while continuously feeding ethylene for 3 hours at a temperature of 100° C. under a pressure of 41 kg/cm$^2$. After cooling, a part of the reaction mixture was withdrawn and analyzed by gas chromatography. As a result, activity of the catalyst was 30,002 g/g-Cr/Hr. Selectivities of the products were as follows: C4 (butenes and butane) 0.2%, C6 (hexenes and hexane) 76.4%, C8 (octenes and octane) 0.5%, C10 (decenes and decane) 19.4%, C12–C26 (compounds having 12 or more carbon atoms) 3.5%. The purity of 1-hexene in C6 was 98.7%.

The results mentioned above demonstrate that the following continuous system can be practiced. The numerical figure embraced by [ ] corresponds to each equipment shown in FIG. 6, and the Roman figure embraced by <> corresponds to each stream in FIG. 6.

A SUS 316 reactor [1] having a capacity of 1 liter is charged with 400 g of 1-hexene as a solvent and 22.5 g of the solution of ethylene trimerization catalyst in 1-hexene mentioned in the Example of Preparation of Catalyst. While keeping a temperature of 100° C., a pressure of 41 kg/cm$^2$ and a residence time of 2 hours, starting ethylene is continuously fed at a rate of 2.86 NL/min. and the solution of ethylene trimerization catalyst in 1-hexene mentioned in Example of Preparation of Catalyst is continuously fed at a rate of 0.21 g/min. At the same time, a part of the liquid phase in the reactor is continuously withdrawn so as to maintain a constant liquid quantity in the reactor. Under such conditions, a trimerization of ethylene is carried out to obtain liquid reaction mixture <a> of which composition is as shown in Table 1.

The liquid reaction mixture <a> is continuously fed into distillation column [2], and distilled under the following conditions: theoretical plate 10, reflux ratio 0.15, column top pressure 5.4 kg/cm$^2$, column bottom pressure 5.7 kg/cm$^2$. As a result, a gaseous ethylene having the composition shown in Table 1 and a distillate <b> consisting mainly of C4 or C6 are obtained from the top of the column. From the bottom of the column, effluent <c> consisting mainly of C8 or C10 having the composition shown in Table 1 is continuously discharged out of the system.

The distillate <b> obtained from the top and fresh ethylene <d> fed from outside of system are continuously fed into polymerization reactor [3], and a polymerization reaction is carried out in toluene solvent in the presence of ethylenebis-indenyl zirconium dichloride and MMAO (modified metal Aluminoxane) (type 3A, manufactured by Tosoh-Akzo Co.) as polymerization catalysts at a temperature of 80° C. and a pressure of 6 kg/cm$^2$. Thus, an ethylene-α-olefin copolymer is obtained.

TABLE 1

| Component | Reaction solution <a> | | Top liquid <b> | | Bottom liquid <c> | |
| --- | --- | --- | --- | --- | --- | --- |
|  | wt % | g/hr | wt % | g/hr | wt % | g/hr |
| Ethylene | 12.0 | 27 | 15.2 | 27 | 0 | 0 |
| C4 | 0.1 | <1 | 0.2 | <1 | 0 | 0 |
| C6 | 68.3 | 155 | 84.5 | 151 | 8.8 | 4 |
| C8 | 0.5 | 1 | 0.1 | <1 | 1.7 | <1 |
| C10 | 16.0 | 36 | <0.1 | <1 | 74.8 | 36 |
| C12–25 | 2.9 | 7 | 0 | 0 | 13.5 | 7 |
| Total | 99.8 | 227 | 100 | 179 | 98.8 | 48 |

EXAMPLE 2

Example 2 is an embodiment corresponding to FIG. 8.

A trimerization of ethylene is carried out in the same manner as in Example 1 to obtain the reaction solution <a> of which composition is as shown in Table 1. The reaction solution <a> is continuously fed into distillation column [2] and distilled under the following conditions: theoretical plate 8, reflux ratio 1, column top pressure 20.7 kg/cm$^2$, column bottom pressure 21 kg/cm$^2$. As a result, the distillate <e> obtained from the top and the effluent <f> obtained from the bottom are obtained, of which compositions are as shown in Table 2.

The distillate <e> obtained from the top is fed without additional elevation of pressure, together with fresh ethylene <d> supplied from outside of system, into the polymerization reactor continuously. The effluent <f> obtained from the bottom is continuously fed to distillation column [5] and distilled under the following conditions: theoretical plate 5, reflux ratio 1, column top pressure 0.16 kg/cm$^2$, column bottom pressure 0.23 kg/cm$^2$. As a result, the distillate <g> obtained from the top and the effluent <h> obtained from the bottom are obtained, of which compositions are as shown in Table 2. The distillate <g> is continuously fed to the polymerization reactor.

The distillate <b> obtained from the top of the distillation column [2], fresh ethylene <d> supplied from outside of the system and the distillate <g> obtained from the top of the distillation column [5] are continuously fed into polymerization reactor [3], and the procedure of Example 1 is repeated.

TABLE 2

| Component | [2] Top <e> wt % | [2] Top <e> g/h | [2] Bottom <f> wt % | [2] Bottom <f> g/h | [5] Top <g> wt % | [5] Top <g> g/h | [5] Bottom <h> wt % | [5] Bottom <h> g/h |
|---|---|---|---|---|---|---|---|---|
| Ethylene | 90.7 | 27 | 0.1 | <1 | 0.2 | <1 | 0 | 0 |
| C4 | 0.6 | <1 | 0.1 | <1 | 0.1 | <1 | 0 | 0 |
| C6 | 8.7 | 3 | 77.2 | 153 | 99.4 | 150 | 6.0 | 3 |
| C8 | 0 | 0 | 0.5 | 1 | 0.2 | <1 | 1.7 | <1 |
| C10 | 0 | 0 | 18.4 | 36 | 0.1 | <1 | 77.1 | 36 |
| C10–26 | 0 | 0 | 3.3 | 7 | 0 | 0 | 14.0 | 7 |
| Total | 100 | 30 | 99.6 | 198 | 100 | 151 | 99.8 | 47 |

What is claimed is:

1. A process for producing an ethylene-α-olefin copolymer which comprises the following steps 1 to 3:

Step 1: subjecting ethylene to an oligomerization reaction in the presence of an oligomerization catalyst to convert a part of the ethylene to α-olefin, and thereby obtaining a reaction solution, a reaction gas or a mixture of the reaction solution and the reaction gas containing said α-olefin and unreacted ethylene;

Step 2: distilling the reaction solution, the reaction gas or the mixture of the reaction solution and the reaction gas to obtain a mixture consisting mainly of ethylene and α-olefin from the top of the distillation column so that at least 95% by weight of the mixture obtained from the top of the distillation column consists of ethylene and α-olefin; and Step 3: feeding a starting material comprising the mixture obtained in Step 2 into a polymerization reactor, thereby copolymerizing the ethylene and α-olefin in the presence of a polymerization catalyst to obtain an ethylene-α-olefin copolymer.

2. A process according to claim 1, wherein the oligomerization catalyst system of Step 1 is a trimerization catalyst system for ethylene, and the obtained α-olefin is 1-hexene.

3. A process according to claim 1, wherein the oligomerization catalyst system of Step 1 is a dimerization catalyst system for ethylene, and the obtained α-olefin is 1-butene.

4. A process according to claim 1, which comprises cooling the mixture obtained from the top of the distillation column of Step 2 to obtain a gas consisting mainly of ethylene and a liquid consisting mainly of α-olefin, and feeding said gas and said liquid to the polymerization reactor of Step 3.

5. A process according to claim 1, which comprises obtaining a mixture consisting mainly of ethylene from the top of the distillation column of Step 2, obtaining an effluent from the bottom thereof, further distilling said effluent to obtain a mixture consisting mainly of α-olefin from the top of the second distillation column, and feeding the mixture consisting mainly of ethylene and the mixture consisting mainly of α-olefin into the polymerization reactor of Step 3.

6. A process according to claim 1, 4 or 5, wherein the mixture obtained in Step 2 and ethylene freshly supplied from a route other than Steps 1 and 2 are used as starting materials of the polymerization of Step 3.

7. A process for producing an ethylene-α-olefin copolymer which comprises the following steps 1 to 3:

Step 1: subjecting ethylene to an oligomerization reaction in the presence of an oligomerization catalyst to convert a part of the ethylene to α-olefin, and thereby obtaining a reaction solution, a reaction gas or a mixture of the reaction solution and the reaction gas containing said α-olefin and unreacted ethylene;

Step 2: distilling the reaction solution, the reaction gas or the mixture of the reaction solution and the reaction gas to obtain a mixture consisting mainly of ethylene and α-olefin from the top of the distillation column, wherein distillation was performed with at least 3 theoretical plates, reflux ratio of at least 0.05 and a pressure of at least 30 kg/cm$^2$; and Step 3: feeding a starting material comprising the mixture obtained in Step 2 into a polymerization reactor, thereby copolymerizing the ethylene and α-olefin in the presence of a polymerization catalyst to obtain an ethylene-α-olefin copolymer.

8. A process for producing an ethylene-α-olefin copolymer which consists essentially of the following steps 1 to 3:

Step 1: subjecting ethylene to an oligomerization reaction in the presence of an oligomerization catalyst to convert a part of the ethylene to α-olefin, and thereby obtaining a reaction solution, a reaction gas or a mixture of the reaction solution and the reaction gas containing said α-olefin and unreacted ethylene;

Step 2: distilling the reaction solution, the reaction gas or the mixture of the reaction solution and the reaction gas to obtain a mixture consisting mainly of ethylene and α-olefin from the top of the distillation column so that at least 95% by weight of the mixture obtained from the top of the distillation column consists of ethylene and α-olefin; and Step 3: feeding a starting material comprising the mixture obtained in Step 2 into a polymerization reactor, thereby copolymerizing the ethylene and α-olefin in the presence of a polymerization catalyst to obtain an ethylene-α-olefin copolymer.

* * * * *